(12) United States Patent
Eberl et al.

(10) Patent No.: US 11,886,668 B1
(45) Date of Patent: Jan. 30, 2024

(54) ULTRASONIC TOUCH SENSOR WITH ACTIVE FEEDBACK

(71) Applicant: Infineon Technologies AG, Neubiberg (DE)

(72) Inventors: Matthias Eberl, Taufkirchen (DE); Fabian Merbeler, Munich (DE); Emanuel Stoicescu, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/938,844

(22) Filed: Oct. 7, 2022

(51) Int. Cl.
*G06F 3/043* (2006.01)
*G06F 3/041* (2006.01)

(52) U.S. Cl.
CPC .......... *G06F 3/0436* (2013.01); *G06F 3/0418* (2013.01)

(58) Field of Classification Search
CPC .............................. G06F 3/0418; G06F 3/0436
USPC .................................................. 345/173–179
See application file for complete search history.

(56) References Cited

U.S. PATENT DOCUMENTS

| | | | | |
|---|---|---|---|---|
| 10,719,175 | B2* | 7/2020 | Akhbari | H04M 1/23 |
| 10,806,431 | B2* | 10/2020 | Chen | G01S 15/8925 |
| 10,986,435 | B2* | 4/2021 | Murarka | H04R 31/00 |
| 2014/0176508 | A1* | 6/2014 | Tanaka | G06F 3/0436 345/177 |
| 2015/0087991 | A1* | 3/2015 | Chen | G01S 7/52025 330/253 |
| 2016/0246396 | A1* | 8/2016 | Dickinson | G06F 3/043 |
| 2019/0022428 | A1* | 1/2019 | Maharbiz | A61B 5/686 |
| 2021/0278926 | A1* | 9/2021 | Akhbari | G06F 3/0436 |
| 2021/0303101 | A1* | 9/2021 | Gray | G06F 3/04166 |

* cited by examiner

*Primary Examiner* — Kwin Xie (74) *Attorney, Agent, or Firm* — Harrity & Harrity, LLP (57) ABSTRACT

A touch sensor includes: a transmitter configured to transmit an ultrasonic transmit wave towards a touch structure; a receiver configured to receive an ultrasonic reflected wave produced from the ultrasonic transmit signal being at least partially reflecting by the touch structure; a receiver circuit configured to convert the ultrasonic reflected wave into a measurement signal; the receiver circuit configured to generate an error value representative of a difference between a measured value of the measurement signal and a reference value; a programmable voltage source configured to provide a bias voltage to the transmitter or to the receiver; a controller configured to adjust the bias voltage based on the error value; a measurement circuit configured to measure the DC bias voltage and determine whether a no-touch event or a touch event has occurred at the touch structure based on at least one measurement of the bias voltage.

20 Claims, 7 Drawing Sheets

ULTRASONIC TOUCH SENSOR WITH ACTIVE FEEDBACK

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event that can be used to discriminate between the existence or the non-existence of the touch event.

SUMMARY

In some implementations, a touch sensor includes a housing having an ultrasound chamber; a touch structure coupled to the housing and arranged over the ultrasound chamber such that the ultrasound chamber forms an enclosed interior volume, wherein the touch structure includes a touch interface; a transmitter arranged inside the enclosed interior volume, wherein the transmitter is configured to transmit an ultrasonic transmit wave towards the touch structure; a receiver arranged inside the enclosed interior volume and coupled to the transmitter via a propagation path, wherein the receiver is configured to receive an ultrasonic reflected wave produced from the ultrasonic transmit wave and the propagation path; a programmable voltage source configured to provide a bias voltage to the transmitter or to the receiver; a receiver circuit configured to convert the ultrasonic reflected wave into a measurement signal and generate an error value representative of a difference between a measured value of the measurement signal and a reference value; a controller configured to adjust the bias voltage based on the error value; and a measurement circuit configured to measure the bias voltage and determine whether a no-touch event or a touch event has occurred at the touch interface based on the bias voltage.

In some implementations, a method includes transmitting an ultrasonic transmit wave towards an inner interface of a touch structure, wherein the inner interface is arranged opposite to a touch interface of the touch structure; receiving an ultrasonic reflected wave produced from the ultrasonic transmit wave being at least partially reflected by the touch structure; converting the ultrasonic reflected wave into a measurement signal; generating an error value representative of a difference between a measured value of the measurement signal and a reference value; providing a bias voltage to the transmitter or to the receiver; adjusting the bias voltage based on the error value; measuring the bias voltage; and determining whether a no-touch event or a touch event has occurred at the touch interface based on measuring the bias voltage.

BRIEF DESCRIPTION OF THE DRAWINGS

Implementations are described herein making reference to the appended drawings.

DETAILED DESCRIPTION

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained.

Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A sensor may refer to a component which converts a property to be measured to an electrical signal, for example, a current signal or a voltage signal. For an ultrasonic touch sensor, the property is an ultrasound wave produced, for example, by a microelectromechanical system (MEMS) transducer. The ultrasound wave is directed at a touch structure where the ultrasound wave is reflected back by the touch structure as a reflected ultrasound wave. The reflected ultrasound wave can be used for sensing touch (e.g., a touch event) through metal surfaces. Specifically, the ultrasonic touch sensor can use the reflected ultrasound wave to discriminate between an existence of the touch event or a non-existence of the touch event (e.g., a no-touch event).

However, there are many types of disturbances that can influence the reflected ultrasound wave and affect the detection of a true touch event over no-touch events and false touch events. For example, ultrasonic sensing is vulnerable to electrical cross-talk between an ultrasonic transmitter and an ultrasonic receiver coupled via a circuit substrate, ultrasonic cross-talk between the ultrasonic transmitter and the ultrasonic receiver via a coupling medium, multipath propagation of the ultrasonic wave (e.g., when the ultrasonic wave is reflected by various interfaces in a sensor package), electrical and mechanical receiver noise, temperature dependency, and/or environmental disturbances, such as dirt or water, present on a touch surface of the touch structure. In addition, to enable accurate sensing, the ultrasonic touch sensor should be calibrated to account for various calibration factors, such as different touch surfaces, variations in mounting, non-linear behaviors, large offsets, and drifting effects (e.g., aging effects and temperature dependencies). A high sampling rate (e.g., 1 megahertz (MHz) or greater) and extensive calculations may be used to compensate for the disturbances and the various calibration factors in order to obtain a usable measurement signal. However, the high sampling rate and extensive calculations require high processing power, longer processing times, and a large amount of system resources. Longer processing times not only leads to higher power consumption and ties up the system resources for longer durations, but also increases a time between successive touch measurements, thereby negatively impacting a frame rate of the ultrasonic touch sensor.

Some implementations disclosed herein are directed to an ultrasonic touch sensor with an active feedback control loop that enables a lower sampling rate (e.g., less than 1 MHz). For example, an output signal of the active feedback control loop can be sampled at the lower sampling rate. Moreover, the output signal may be less sensitive to disturbances and various calibration factors. As a result, the ultrasonic touch sensor may use less complex calculations to obtain a usable measurement signal that is indicative of a touch event or a no-touch event. The less complex calculation may lead to lower power consumption, shorter processing times, and a lower amount of system resources.

Figure 1:
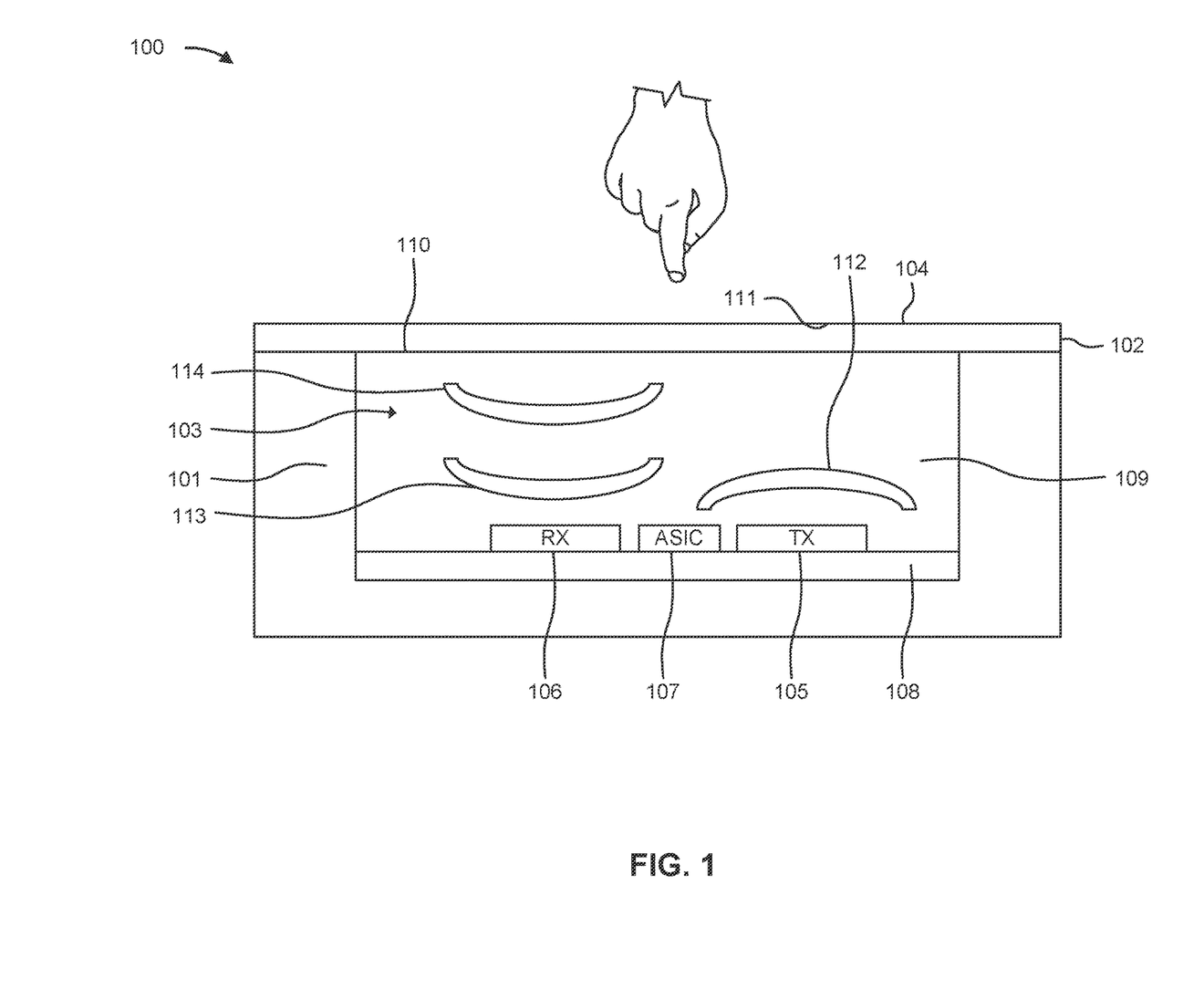
FIG. 1 illustrates an ultrasonic touch sensor according to one or more implementations.

FIG. 1 illustrates an ultrasonic touch sensor 100 according to one or more implementations. The ultrasonic touch sensor 100 includes a housing comprising a frame 101 and a touch structure 102 (e.g., a touch substrate) that forms an enclosed interior volume 103 with the frame 101. The frame 101 may be made of an encapsulant, such as overmolded thermoplastic or another type of molding material. As part of the housing, the frame 101 has a recess that becomes the enclosed interior volume 103 when the touch structure 102 encloses the recess. In some implementations, part of the frame 101 may extend into and fill the enclosed interior volume 103, thereby covering one or more sensor components arranged therein. Epoxy or some other ultrasound-compatible material casted in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the housing. In the example shown, the enclosed interior volume 103 is a chamber that is formed by the enclosure of the frame 101 and the touch structure 102. The touch structure 102 may be made of one or more metal layers, one or more plastic layers, and/or one or more layers made out of another solid material. The touch structure 102 includes a touch surface 104 at its external interface with an environment. The touch surface 104 is arranged and operable to receive contact (e.g., touches) from a user that can be detected by sensor circuitry.

The enclosed interior volume 103 contains the sensor circuitry used for detecting the no-touch events and the touch events at the touch surface 104. A touch event is defined as an instance when the user makes contact with the touch surface 104 and a no-touch event is all other circumstances, including the occurrence of disturbing influences (i.e., error sources) that may occur in the absence of the touch event. The sensor circuitry is configured to distinguish between the touch event and the no-touch event, taking into account possible errors originating from the disturbing influences.

As defined herein, an ultrasound wave is a sound wave having a frequency of 20 kHz or higher. An ultrasound wave may be referred to as an ultrasonic transmit wave when the ultrasound wave is transmitted by a transmitter and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including control of the transmitter 105, the receiver 106, or any signal processing components of a signal processing chain of the sensor circuit 107. In some implementations, the ultrasonic touch sensor 100 may include an active feedback control loop from which a measurement signal is output and evaluated for detecting the no-touch events and the touch events by applying a second touch detection algorithm.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducer (CMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the enclosed interior volume 103 may be filled with a coupling medium 109, such as a silicone gel, soft epoxy, liquid, or any other material that enables the propagation of ultrasonic waves with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. In order to provide mechanical coupling between the touch structure 102 and the receiver 106, the coupling medium 109 is a non-gaseous medium.

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 towards the touch structure 102 (e.g., at the first interface 110 and the second interface 111). The first interface 110 and the second interface 111 are configured to reflect the ultrasonic transmit wave 112 back into the enclosed interior volume 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113 and the second interface 111 reflects the ultrasonic transmit wave 112 by internal reflection to produce the ultrasonic reflected wave 114. Being that the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received and the sensor circuit 107 may obtain a first measurement signal from the continuous measurement signal in a first observation window corresponding to the ultrasonic reflected wave 113 and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As will be described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 changes when the touch surface 104 is touched by, for example, a finger of the user. The change in the ultrasonic reflected wave 114 can be detected or used at a receiver side of the ultrasonic touch sensor 100 for detecting the touch event or the no-touch event as well as determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, it can be said that a property of the ultrasonic reflected wave 114 will depend on the existence or the non-existence of the touch event. The property of the reflected ultrasonic sound wave can be measured at the sensor circuit 107 to discriminate between a presence of the touch event or the no-touch event.

Meanwhile, it can be said that the acoustic impedance change resulting from the touch event is minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, environmental disturbances, such as dirt or water on the touch surface 104. The touch detection algorithm may take into account or be insensitive to various calibration factors, including different touch surfaces, variations in mounting, non-linear behaviors, large offsets, and drifting effects.

The touch detection algorithm may include a machine learning model that is trained to distinguish between a touch and no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch and no-touch event using a machine learning model. The machine learning model may include and/or may be associated with, for example, a neural network. In some implementations, the sensor circuit 107 uses the machine learning model to distinguish between a touch and no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable, for example, that a no-touch, a touch, a short touch, a long touch, a soft touch, a hard touch, a static touch, or a dynamic (e.g., a moving) touch is present at the touch surface 104.

The sensor circuit 107 may train, update, and/or refine the machine learning model to increase the accuracy of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 is configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be in the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoid, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples may be used for performing the direct down-conversion. Analog circuit blocks for such a down-conversion processing can be a multiplier or even just a diode. A low-pass filter cut-off frequency should be tuned to the bandwidth of the transmitted ultrasonic signal and the bandwidth of the transmitter 105. For example, the low-pass filter cut-off frequency could be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from the measurement signal output from the active feedback control loop and store the digital samples in memory for evaluation.

A digital processor of the sensor circuit 107 is operable to evaluate digital samples received in an observation window using the touch detection algorithm to determine whether there is the no-touch event or the touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time it takes for the ultrasonic transmit wave 112 to travel from the transmitter 105, to the first interface 110, and back to the receiver 106. Likewise, a time-of-flight of a second reflection (e.g., the ultrasonic reflected wave 114) is a time it takes for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided merely as an example. Other examples are possible and may differ from what was described with regard to FIG. 1. For example, in some implementations, an array or transmitters, receivers, or transceivers may be provided within the enclosed interior volume 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

Figure 2A:
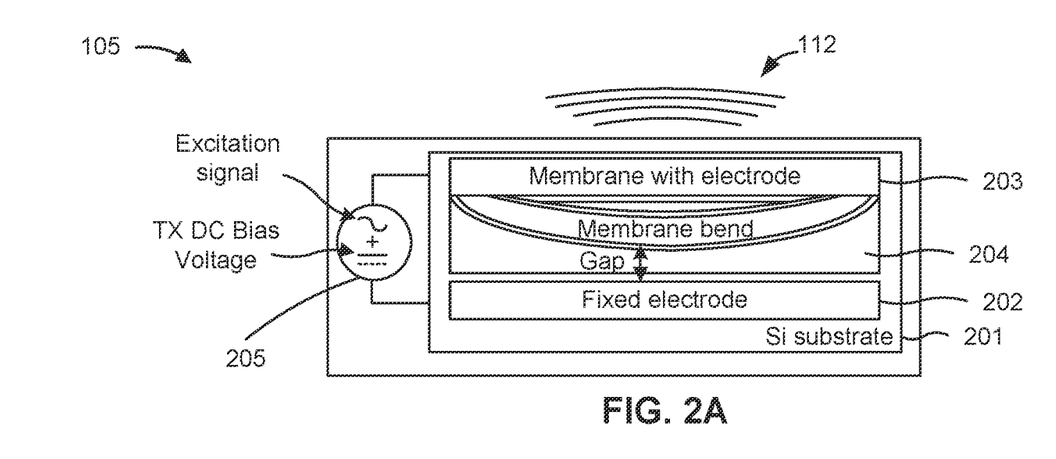
FIG. 2A illustrates a transmitter according to one or more implementations.

FIG. 2A illustrates the transmitter 105 according to one or more implementations. The transmitter 105 is a CMUT that includes a substrate 201, a first transmitter electrode 202 formed on or integrated in the substrate 201, a second transmitter electrode 203 (e.g., a flexible membrane with a conductive layer), a cavity 204 formed between the first transmitter electrode 202 and the second transmitter electrode 203. In some implementations, the substrate 201 may be made out of silicon (Si). An atmospheric pressure inside of the cavity 204 may be a vacuum pressure that enables the second transmitter electrode 203 to deflect inwards towards the first transmitter electrode 202 with no, or substantially no, frictional force acting thereon from within the cavity 204 as the second transmitter electrode 203 vibrates.

The first transmitter electrode 202 and the second transmitter electrode 203 form a transmitter capacitor. The transmitter 105 includes a programmable voltage source 205 coupled across the first transmitter electrode 202 and the second transmitter electrode 203. The programmable voltage source 205 provides a TX DC bias voltage to the first transmitter electrode 202 and the second transmitter electrode 203. In addition, the programmable voltage source 205 provides an excitation signal (e.g., an AC signal) to the first transmitter electrode 202 and the second transmitter electrode 203 that is superimposed onto the TX DC bias voltage. The excitation signal actuates the flexible membrane of the second transmitter electrode 203 via electrostatic force, thereby generating the ultrasonic transmit wave 112.

The TX DC bias voltage is programmable and, as a result, is adjustable. For example, the TX DC bias voltage may be adjustable within a predetermined TX DC bias voltage range defined by a minimum TX DC bias voltage and a maximum TX DC bias voltage. In some implementations, the predetermined TX DC bias voltage range may be 0V to approximately 36V, but is not limited thereto. As will be explained in greater detail below, the sensor circuit 107 may be configured to adjust the TX DC bias voltage to make a touch/no-touch decision. A transmission power of the ultrasonic transmit wave 112 is proportional to a voltage level of the TX DC bias voltage. Thus, an ultrasound wave, that is produced by the transmitter 105 when the TX DC bias voltage has a higher voltage level, is stronger (e.g., as a higher signal amplitude) than an ultrasound wave that is produced when the TX DC bias voltage has a lower voltage level. Consequently, waveforms of the ultrasonic reflected waves 113 and 114 may be altered based on the TX DC bias voltage because the signal amplitudes of the ultrasonic reflected waves 113 and 114 correspond to the transmission power of the ultrasonic transmit wave 112, with the ultrasonic reflected waves 113 and 114 typically being a percentage of the ultrasonic transmit wave 112. Altering the waveforms of the ultrasonic reflected waves 113 and 114, ultimately results in altering the measurement signals read out of the receiver 106, since measurement signals read out of the receiver 106 are representative of the ultrasonic reflected waves 113 and 114, respectively. A signal amplitude of a measurement signal read out of the receiver 106 may be a local maximum, an absolute maximum, a local minimum, an absolute minimum, a peak-to-peak value, an average value, an integrated value, a summed value, or any other signal parameter indicative of a magnitude of the measurement signal read out of the receiver 106 during an observation window.

As indicated above, FIG. 2A is provided merely as an example. Other examples are possible and may differ from what was described with regard to FIG. 2A. For example, in some implementations, materials different from materials described above may be used. In some implementations, additional circuit components may be integrated within, or attached to, the transmitter 105 without deviating from the disclosure provided above.

Figure 2B:
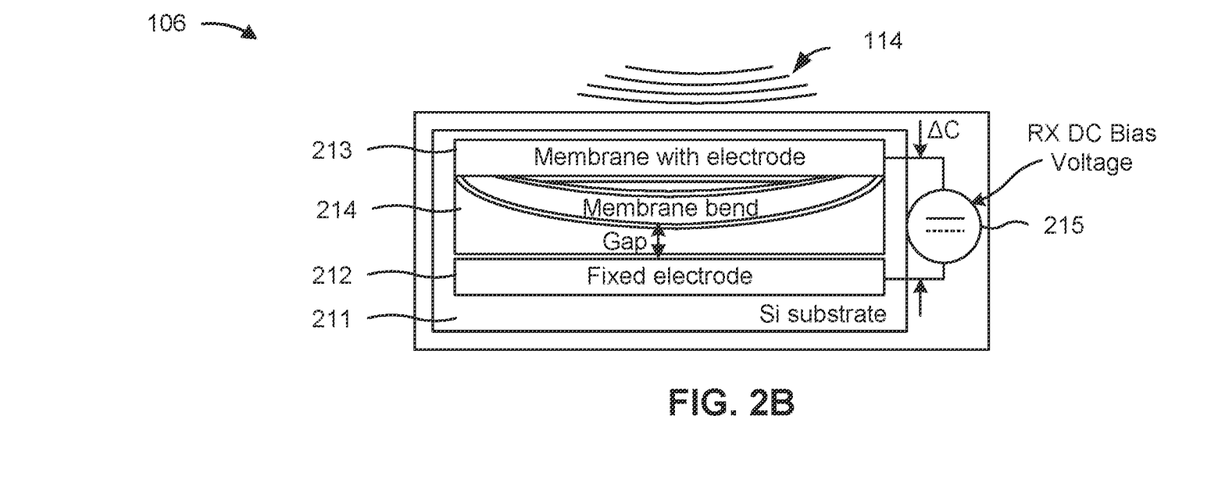
FIG. 2B illustrates a receiver according to one or more implementations.

FIG. 2B illustrates the receiver 106 according to one or more implementations. In some implementations, the transmitter 105 shown in FIG. 2A and the receiver 106 shown in FIG. 2B may combined as a single CMUT that is configured as a transceiver. The receiver 106 shown in FIG. 2B is a CMUT that includes a substrate 211, a first receiver electrode 212 formed on or integrated in the substrate 211, a second receiver electrode 213 (e.g., a flexible membrane with a conductive layer), a cavity 214 formed between the first receiver electrode 212 and the second receiver electrode 213. In some implementations, the substrate 201 may be made out of silicon (Si). An atmospheric pressure inside of the cavity 214 may be a vacuum pressure that enables the second receiver electrode 213 to deflect inwards towards the first receiver electrode 212 with no, or substantially no, frictional force acting thereon from within the cavity 214 as the second receiver electrode 213 vibrates.

The first receiver electrode 212 and the second receiver electrode 213 form a receiver capacitor having a capacitance that changes based on a gap between the first transmitter electrode 202 and the second transmitter electrode 203. The second transmitter electrode 203 vibrates in response to receiving the ultrasonic reflected waves 113 and 114, which causes the capacitance to change as the gap changes with a vibration of the second transmitter electrode 203.

The receiver 106 includes a programmable voltage source 215 coupled across the first receiver electrode 212 and the second receiver electrode 213. The programmable voltage source 215 provides an RX DC bias voltage to the first receiver electrode 212 and the second receiver electrode 213, which affects a sensitivity of the receiver 106. Additionally, the change in capacitance ΔC can be measured across the programmable voltage source 215 as an alternating signal that is proportional to the ultrasonic reflected waves 113 and 114. Thus, the alternating signal is the measurement signal read out at the receiver 106 that is representative of received ultrasound waves.

The RX DC bias voltage is programmable and, as a result, is adjustable. For example, the RX DC bias voltage may be adjustable within a predetermined RX DC bias voltage range defined by a minimum RX DC bias voltage and a maximum RX DC bias voltage. In some implementations, the predetermined RX DC bias voltage range may be 0V to approximately 36V, but is not limited thereto. As will be explained in greater detail below, the sensor circuit 107 may be configured to adjust the RX DC bias voltage to make a touch/no-touch decision. When the receiver 106 is configured with a higher sensitivity (e.g., by regulation of the RX DC bias voltage), a signal amplitude of the measurement signal read out at the receiver 106 is increased. In contrast, when the receiver 106 is configured with a lower sensitivity (e.g., by regulation of the RX DC bias voltage), the signal amplitude of the measurement signal read out at the receiver 106 is decreased. Consequently, altering the sensitivity of the receiver 106 results in altering the measurement signals read out of the receiver 106.

As indicated above, FIG. 2B is provided merely as an example. Other examples are possible and may differ from what was described with regard to FIG. 2B. For example, in some implementations, materials different from materials described above may be used. In some implementations, additional circuit components may be integrated within, or attached to, the receiver 106 without deviating from the disclosure provided above.

Figure 3:
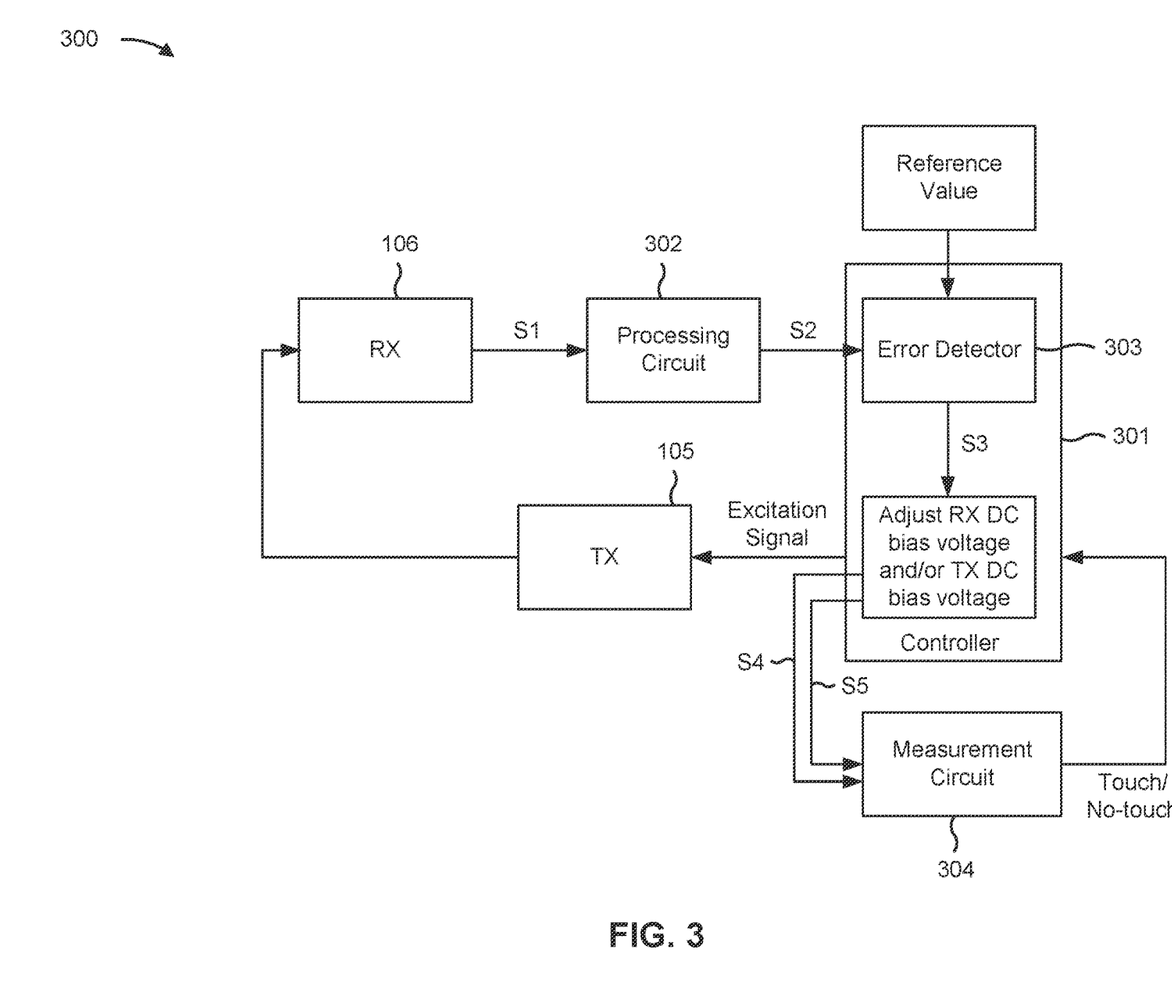
FIG. 3 illustrates an active feedback control loop according to one or more implementations.

FIG. 3 illustrates an active feedback control loop 300 according to one or more implementations. The active feedback control loop 300 includes a controller 301 that triggers an ultrasonic measurement by providing an excitation signal to the transmitter 105. The controller 301 may be included in the sensor circuit 107 shown in FIG. 1. The transmitter 105 is configured to transmit the ultrasonic transmit wave 112 towards the touch structure 102. The receiver 106 is coupled to the transmitter 105 via a propagation path that includes the coupling medium 109 and the touch structure 102. As a result, the receiver 106 is configured to receive a reflected ultrasound wave produced from the ultrasonic transmit wave 112 and the touch structure 102. In some implementations, the ultrasonic reflected wave 114 may be of interest and may be targeted for measurement. For example, the sensor circuit 107 may set an observation window that targets a predetermined time interval during which the ultrasonic reflected wave 114 is expected to be received by the receiver 106. In this way, the sensor circuit 107 may use an output of the receiver 106, read out during the predetermined time interval corresponding to the ultrasonic reflected wave 114, for a touch/no-touch decision.

A receiver circuit may be shared by the receiver 106 and the sensor circuit 107. For example, the receiver 106 may be configured to convert the ultrasonic reflected wave 114 into a first measurement signal S1. For example, the first measurement signal S1 may be the alternating signal output by the receiver 106 and read out by the sensor circuit 107. The sensor circuit 107 may be configured to read out the first measurement signal S1 during the predetermined time interval and perform additional processing on the first measurement signal S1.

The active feedback control loop 300 may include a processing circuit 302 that is configured to process the first measurement signal S1 in order to determine a feature of the first measurement signal S1 and generate a measured value S2 based on the feature of the first measurement signal S1.

In some implementations, the processing circuit 302 may include a processor, included in the sensor circuit 107, that is configured to evaluate the feature of the first measurement signal S1 in order to generate the measured value S2 that is representative of the feature of the first measurement signal S1. The processor may operate in an analog domain (e.g., an analog processing circuit), in a digital domain (e.g., a digital processing circuit), or both in the analog domain and the digital domain for evaluating the feature of the first measurement signal S1 and for generating the measured value S2. Thus, the measured value S2 may be an analog value or a digital value. The processor may be operable in combination with other processing components of the processing circuit 302 described herein to generate the measured value.

In some implementations, the processing circuit 302 may be configured to calculate an average value of the first measurement signal S1 as the measured value S2. In some implementations, the processing circuit 302 may be configured to determine a maximum signal amplitude of the first measurement signal S1 as the measured value S2. In some implementations, the processing circuit 302 includes an integrator that receives the first measurement signal S1 and generates the measured value S2 as an integration result of the first measurement signal S1 over the predetermined time interval. The integrator may receive the first measurement signal S1 after a rectifier that rectifies the alternating signal. In some implementations, the processing circuit 302 may be configured to calculate a mean square error of the first measurement signal S1 as the measured value S2.

In some implementations, the processing circuit 302 may include a peak detector that is configured to receive the first measurement signal S1 and detect signal peaks of the first measurement signal S1. The processor of the processing circuit 302 may be configured to generate the measured value S2 based on the detected signal peaks. For example, the processor may determine an absolute peak (e.g., an absolute maximum or an absolute minimum) of the first measurement signal S1 measured during the predetermined time interval as the measured value S2. In another example, the processor may determine an average or a sum of two or more peaks measured during the predetermined time interval as the measured value S2. In another example, the processor may determine an average or a sum of all peaks measured during the predetermined time interval as the measured value S2. In another example, the processor may determine a peak-to-peak value of the first measurement signal S1, an average of multiple peak-to-peak values of the first measurement signal S1, or a sum of multiple peak-to-peak values of the first measurement signal S1 as the measured value S2.

In some implementations, the processing circuit 302 may include an ADC configured to generate a plurality of digital samples from the first measurement signal S1 over the predetermined time interval and the processing circuit 302 is configured to generate the measured value S2 based on the plurality of digital samples. For example, the processor of the processing circuit 302 may be configured to determine an absolute maximum of the first measurement signal S1 from the plurality of digital samples as the measured value S2. In another example, the processor of the processing circuit 302 may determine an average or a sum of the plurality of digital samples as the measured value S2.

The active feedback control loop 300 may further include an error detector 303, such as an error amplifier or a proportional-integral-derivative (PID) controller. In some implementations, the error detector 303 may be integrated in the controller 301. The error detector 303 is configured to receive the measured value S2 and a reference value and generate an error value S3 that represents a difference between the measured value S2 and the reference value. The error detector 303 may be configured to receive the measured value S2 as a measured process variable, receive the reference value as a setpoint, and generate the error value S3 based on the difference between the measured value S2 and the reference value.

The controller 301 is configured to use the error value S3 to adjust the TX DC bias voltage, the RX DC bias voltage, or both the TX DC bias voltage and the RX DC bias voltage to reduce the error value S3 to, for example, a predetermined value (e.g., zero or to some other value, or a value that satisfies a threshold, among other examples). During a no-touch event, the ultrasonic reflected wave 114 has an expected waveform or an expected pattern that may be used to determine the reference value provided to the error detector 303. As a result, the first measurement signal S1 has an expected waveform or an expected pattern corresponding to the ultrasonic reflected wave 114 during the no-touch event. As a result, a difference between the measured value S2 and the reference value should be small during the no-touch event. In particular, the difference between the measured value S2 and the reference value should be less than an error threshold and may be ideally zero. When, the difference between the measured value S2 and the reference value is small (e.g., less than the error threshold or zero), the ultrasonic reflected wave 114 matches the expected waveform or the expected pattern thereof. The error value S3 generated by the error detector corresponds to the difference between the measured value S2 and the reference value. In some implementations, the error value S3 is equal to the difference between the measured value S2 and the reference value.

In contrast, during a touch event, a property of the ultrasonic reflected wave 114 changes. For example, the signal amplitude of the ultrasonic reflected wave 114 may decrease during the touch event. As a result, a corresponding property of the first measurement signal S1 also changes during the touch event and the first measurement signal S1 deviates from the expected waveform or the expected pattern thereof. As a result, the difference between the measured value S2 and the reference value increases and the error value S3 becomes larger. During the touch event, the error value S3 may satisfy the error threshold by, for example, becoming equal to or greater than the error threshold.

As noted above, the controller 301 is configured to use the error value S3 to adjust the TX DC bias voltage, the RX DC bias voltage, or both the TX DC bias voltage and the RX DC bias voltage to reduce the error value S3. For example, the TX DC bias voltage, the RX DC bias voltage, or a combination of the TX DC bias voltage and the RX DC bias voltage may be used to adjust the first measurement signal S1 to match the expected waveform of the first measurement signal S1, the expected pattern of the first measurement signal S1, or an expected change of the first measurement signal S1 in order to reduce the error value S3. As described in conjunction with FIG. 2A, an adjustment to the TX DC bias voltage induces a change in the alternating signal (e.g., the first measurement signal S1) read out from the receiver 106 by the sensor circuit 107. Similarly, as described in conjunction with FIG. 2B, an adjustment to the RX DC bias voltage induces a change in the alternating signal (e.g., the first measurement signal S1) read out from the receiver 106 by the sensor circuit 107. Therefore, the controller 310 may adjust only the TX DC bias voltage, only the RX DC bias voltage, or both the TX DC bias voltage and the RX DC bias voltage to reduce the error value S3. In some implementations, the controller 310 may adjust only the TX DC bias voltage, only the RX DC bias voltage, or both the TX DC bias voltage and the RX DC bias voltage to maintain the measured value S2 at a constant value (e.g., to maintain the measured value S2 at the reference value).

In some implementations, the controller 310 may adjust the TX DC bias voltage to a TX voltage level that reduces the error value S3 to a predetermined value (e.g., zero or to some other value, or a value that satisfies a threshold, among other examples). For example, the controller 310 may increase the TX DC bias voltage to the TX voltage level in order to increase the signal amplitude of the first measurement signal S1 that results in the error value S3 being reduced to the predetermined value. In some implementations, the controller 310 may adjust the RX DC bias voltage to an RX voltage level that reduces the error value S3 to the predetermined value. For example, the controller 310 may increase the RX DC bias voltage to the RX voltage level in order to increase the signal amplitude of the first measurement signal S1 that results in the error value S3 being reduced to the predetermined value. In some implementations, the controller 310 may adjust the TX DC bias voltage to a TX voltage level and may adjust the RX DC bias voltage to an RX voltage level that, in combination, reduce the error value S3 to the predetermined value.

The active feedback control loop 300 may further include a measurement circuit 304 that is configured to measure the TX DC bias voltage, the RX DC bias voltage, or both the TX DC bias voltage and the RX DC bias voltage and indicate whether the no-touch event or the touch event has occurred at the touch surface 104, shown in FIG. 1, based on a measurement of the TX DC bias voltage, the RX DC bias voltage, or both the TX DC bias voltage and the RX DC bias voltage. Accordingly, the TX DC bias voltage, or a signal derived therefrom, may be used as a second measurement signal S4, and the RX DC bias voltage, or a signal derived therefrom, may be used as a third measurement signal S5.

The measurement circuit 304 may be electrically coupled to the programmable voltage source 205 to measure the TX DC bias voltage (e.g., to measure the second measurement signal S4). The measurement circuit 304 may be electrically coupled to the programmable voltage source 215 to measure the RX DC bias voltage (e.g., to measure the third measurement signal S5).

The controller 310 may adjust the TX DC bias voltage, the RX DC bias voltage, or both the TX DC bias voltage and the RX DC bias voltage a limited number of times per measurement cycle (e.g., a limited number of times per frame). For example, in some implementations, the controller 310 may adjust the TX DC bias voltage, the RX DC bias voltage, or both the TX DC bias voltage and the RX DC bias voltage once per measurement cycle (e.g., once per frame). As a result, the second measurement signal S4 and the third measurement signal S5 undergo a signal change less frequently than a signal change of the first measurement signal S1. In other words, the second measurement signal S4 and the third measurement signal S5 do not contain high frequency elements and a frequency of the second measurement signal S4 and a frequency of the third measurement signal S5 are less than a frequency of the first measurement signal S1 that is in the ultrasonic frequency range.

As a result, the measurement circuit 304 can be operable to sample the second measurement signal S4 and the third measurement signal S5 at a lower sampling rate than a sampling rate used by the processing circuit 302 to sample the first measurement signal S1. In other words, a high-speed ADC is not needed, but rather an ADC with a lower sampling rate may be used. For example, if the processing circuit 302 includes an ADC to sample the first measurement signal S1, the ADC of the processing circuit 302 may be a high-speed ADC that uses a sampling rate in the megahertz range (e.g., 1 MHz or greater). In contrast, if the measurement circuit 304 includes an ADC to sample the second measurement signal S4 and/or to sample the third measurement signal S5, the ADC of the measurement circuit 304 may be a low-speed ADC that uses a sampling rate Fs in the hundreds of hertz range or in the kilohertz (KHz) range (e.g., 100 Hz≤Fs<1 MHz).

Additionally, the second measurement signal S4 and the third measurement signal S5 may be less sensitive and, therefore, less vulnerable to the various disturbances and the various calibration factors described above. As a result, a touch detection algorithm (e.g., the second touch detection algorithm described above in conjunction with FIG. 1) used by the measurement circuit 304 to arrive at the touch/no-touch decision may be less complex when compared to a touch detection algorithm (e.g., the first touch detection algorithm described above in conjunction with FIG. 1) that evaluates the first measurement signal S1 directly.

A lower sampling rate enables the measurement circuit 304 to have a simpler design and enables the measurement circuit 304 to use the second touch detection algorithm of lower complexity. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex. In addition, circuits of lower complexity, in general, have lower manufacturing costs and lower power consumption when compared to circuits of higher complexity. Moreover, the measurement circuit 304 can be implemented entirely in the analog domain, which can have less power consumption compared to circuits implemented in the digital domain.

In some implementations, the measurement circuit 304 may include a first comparator circuit that is configured to compare the TX DC bias voltage and a first threshold to generate a first comparison result. The measurement circuit 304 may be configured to evaluate the TX DC bias voltage relative to the first threshold during a measurement time interval corresponding to the observation window of the ultrasonic reflected wave 114. The first comparison result may indicate whether or not the TX DC bias voltage satisfies the first threshold. For example, if the TX DC bias voltage does not satisfy the first threshold (e.g., the TX DC bias voltage is less than the first threshold), the first comparison result may indicate that the no-touch event has occurred. On the other hand, if the TX DC bias voltage satisfies the first threshold (e.g., the TX DC bias voltage is equal to or greater than the first threshold), the first comparison result may indicate that the touch event has occurred. The measurement circuit 304 may provide the first comparison result to the controller 301 that is configured to determine whether the no-touch event or the touch event has occurred at the touch surface 104 based on the first comparison result.

Additionally, or alternatively, in some implementations, the measurement circuit 304 may include a second comparator circuit that is configured to compare the RX DC bias voltage and a second threshold to generate a second comparison result. The measurement circuit 304 may be configured to evaluate the RX DC bias voltage relative to the second threshold during the DC measurement time interval corresponding to the observation window of the ultrasonic reflected wave 114. The second comparison result may indicate whether or not the RX DC bias voltage satisfies the second threshold. For example, if the RX DC bias voltage does not satisfy the second threshold (e.g., the RX DC bias voltage is less than the second threshold), the second comparison result may indicate that the no-touch event has occurred. On the other hand, if the RX DC bias voltage satisfies the second threshold (e.g., the RX DC bias voltage is equal to or greater than the second threshold), the second comparison result may indicate that the touch event has occurred. The measurement circuit 304 may provide the second comparison result to the controller 301 that is configured to determine whether the no-touch event or the touch event has occurred at the touch surface 104 based on the second comparison result.

Additionally, or alternatively, in some implementations, the measurement circuit 304 or the controller 301 may, for example, by using the second touch detection algorithm, analyze a history of the TX DC bias voltage or the RX DC bias voltage to determine whether the no-touch event or the touch event has occurred at the touch surface 104. The second touch detection algorithm may include a machine learning model that may be trained to distinguish between the touch event and the no-touch event. For example, the second touch detection algorithm may include pattern recognition model to distinguish between the touch event and the no-touch event.

As indicated above, FIG. 3 is provided merely as an example. Other examples are possible and may differ from what was described with regard to FIG. 3. The number and arrangement of components shown in FIG. 3 are provided as an example. In practice, the active feedback control loop 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the active feedback control loop 300 may perform one or more functions described as being performed by another set of components of the active feedback control loop 300. In some implementations, the active feedback control loop 300 may be configured to target any ultrasonic reflected wave for measurement that undergoes a change in response to a touch event occurrent at the touch surface 104. Such a configuration would enable the active feedback control loop 300 flexibility to accommodate different types of touch structures.

Figure 4A:
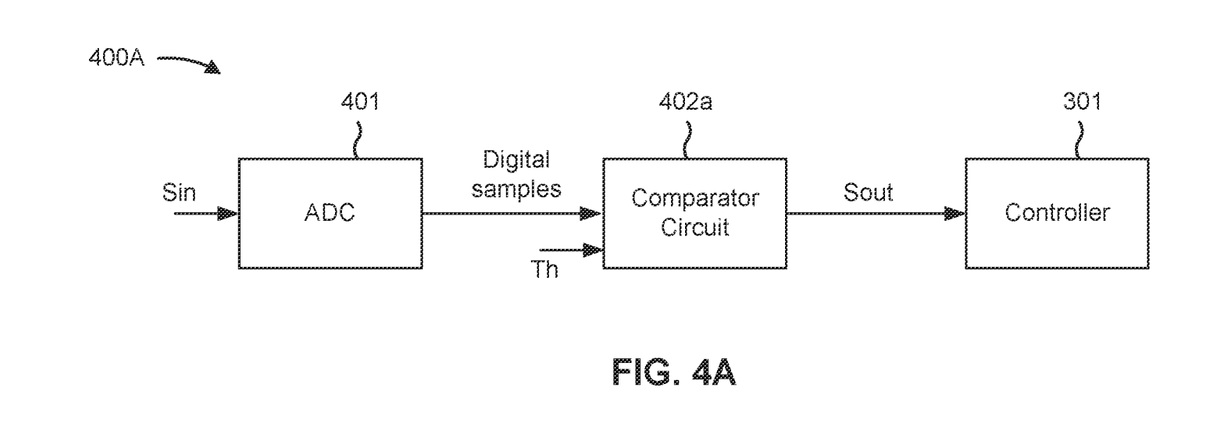
FIG. 4A illustrates an example implementation of a measurement circuit provided in FIG. 3.

FIG. 4A illustrates an example implementation 400A of the measurement circuit 304 provided in FIG. 3. The example implementation 400A includes an ADC 401, a digital comparator circuit 402a, and the controller 301. The ADC 401 is configured to generate a plurality of digital samples of an input signal Sin. The input signal may be the second measurement signal S4 (e.g., the TX DC bias voltage) or the third measurement signal S5 (e.g., the RX DC bias voltage). In some implementations, the digital comparator circuit 402a may include a digital comparator that is configured to compare each of the plurality of digital samples and a threshold Th to generate a respective comparison result for each digital sample of the plurality of digital samples. Accordingly, the digital comparator may generate a plurality of comparison results corresponding to the plurality of digital samples and output the plurality of comparison results in an output signal Sout indicative of whether the no-touch event or the touch event has occurred at the touch surface 104.

For example, in some implementations, the digital comparator circuit 402a may maintain the output signal Sout at a first signal level (e.g., a low signal level) when there is a no-touch event and may toggle the output signal Sout to a second signal level (e.g., a high signal level) when there is a touch event. The digital comparator circuit 402a may toggle the output signal Sout to the second signal level when any of the plurality of digital samples satisfy the threshold Th (e.g., when any of the plurality of digital samples are equal to or greater than the threshold Th). The controller 301 is configured to receive the output signal Sout and determine whether the no-touch event or the touch event has occurred at the touch surface 104 based on the output signal S out.

Alternatively, in some implementations, the digital comparator circuit 402a may include a digital signal processor (DSP) configured to calculate an averaged value or a summed value of the plurality of digital samples and the digital comparator may be configured compare the averaged value or the summed value and the threshold Th to generate a single comparison result that is output by the output signal Sout. The digital comparator circuit 402a may toggle the output signal Sout to the second signal level when the averaged value or the summed value satisfies the threshold Th (e.g., when the averaged value or the summed value is equal to or greater than the threshold Th).

As indicated above, FIG. 4A is provided merely as an example. Other examples are possible and may differ from what was described with regard to FIG. 4A. In some implementations, additional circuit components may be added to the example implementation 400A without deviating from the disclosure provided above.

Figure 4B:
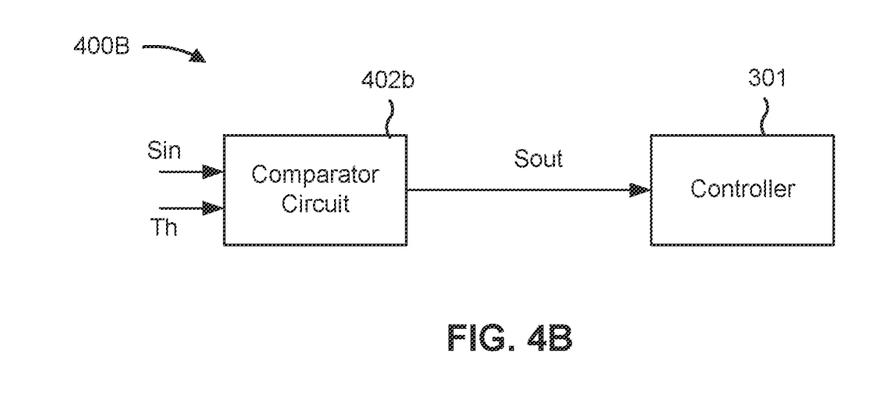
FIG. 4B illustrates another example implementation of a measurement circuit provided in FIG. 3.

FIG. 4B illustrates an example implementation 400B of the measurement circuit 304 provided in FIG. 3. The example implementation 400B includes an analog comparator circuit 402b that receives the input signal Sin. In some implementations, the analog comparator circuit 402b may include an analog comparator that is configured to compare the input signal Sin and the threshold Th during the measurement time interval to generate the output signal Sout indicative of whether the no-touch event or the touch event has occurred at the touch surface 104.

The analog comparator circuit 402b may maintain the output signal Sout at the first signal level when there is a no-touch event and may toggle the output signal Sout to the second signal level when there is a touch event. The analog comparator circuit 402b may toggle the output signal Sout to the second signal level at any point the input signal Sin satisfies the threshold Th during the measurement time interval. The controller 301 is configured to receive the output signal Sout and determine whether the no-touch event or the touch event has occurred at the touch surface 104 based on the output signal Sout.

As indicated above, FIG. 4B is provided merely as an example. Other examples are possible and may differ from what was described with regard to FIG. 4A. In some implementations, additional circuit components may be added to the example implementation 400B without deviating from the disclosure provided above.

Figure 5A:
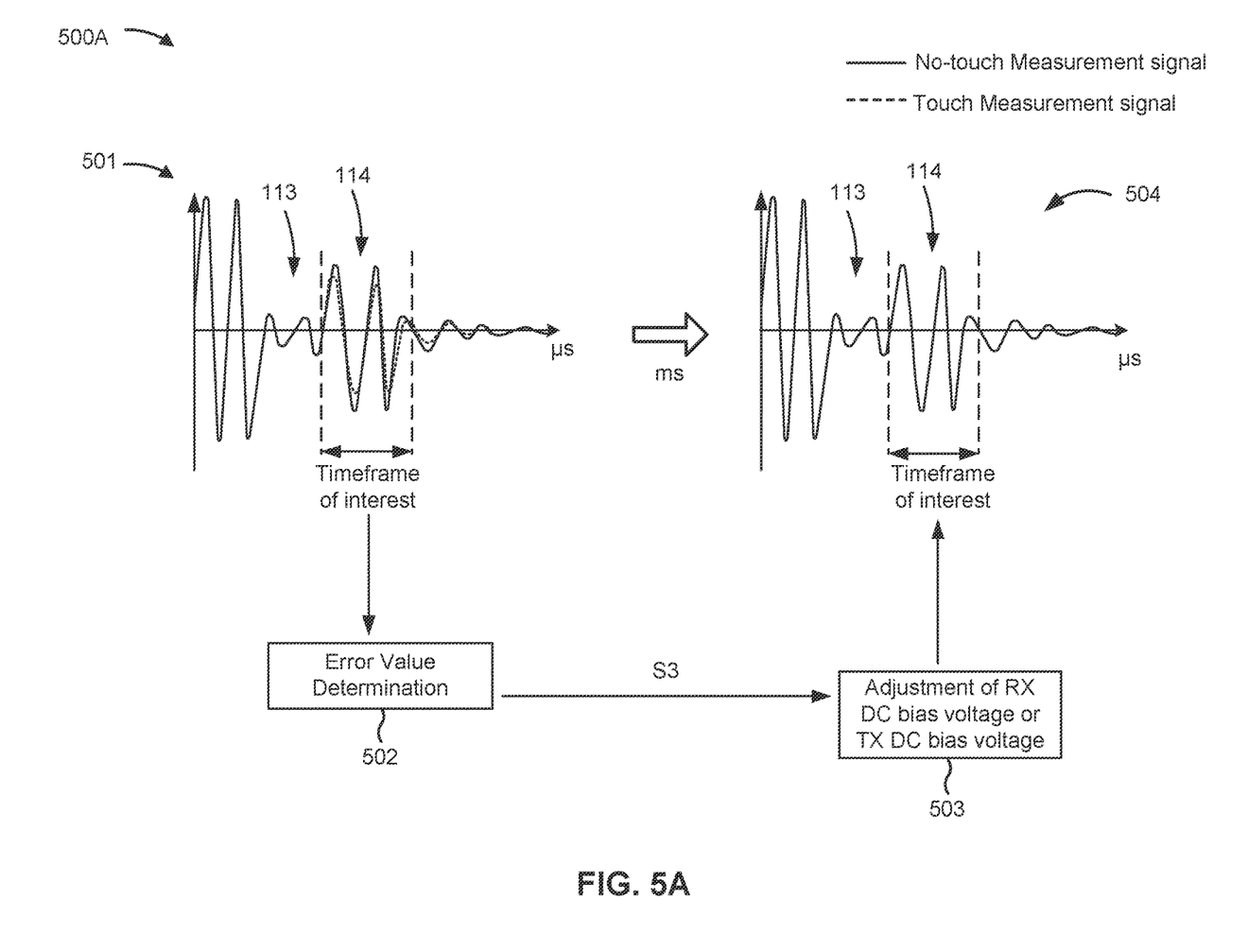
FIG. 5A illustrates a method of reducing an error value during a touch event according to one or more implementations.

FIG. 5A illustrates a method 500A of reducing the error value S3 during a touch event according to one or more implementations. Diagram 501 shows a no-touch measurement signal that may be used as a reference measurement signal is shown. The no-touch measurement signal has a reference waveform or a reference pattern that may be recorded during a no-touch event. The no-touch measurement signal has a first alternating pattern during reception of the ultrasonic reflected wave 113 and has a second alternating pattern during reception of the ultrasonic reflected wave 114. The second alternating pattern occurs in a timeframe of interest (e.g., a predetermined time interval) during which the ultrasonic reflected wave 114 is expected to be received by the receiver 106.

The diagram 501 also shows a touch measurement signal that may be read out from the receiver 106 as the first measurement signal S1. During the touch event, the touch measurement signal deviated from the no-touch measurement signal. For example, a signal amplitude of the touch measurement signal is reduced relative to the no-touch measurement signal.

In block 502, the error value S3 shown in FIG. 3 is determined based on a difference between the touch measurement signal and the no-touch measurement signal shown in diagram 501.

In block 503, the TX DC bias voltage, the RX DC bias voltage, or a combination of the TX DC bias voltage and the RX DC bias voltage is adjusted based on the error value S3.

As a result of adjusting TX DC bias voltage, the RX DC bias voltage, or a combination of the TX DC bias voltage and the RX DC bias voltage, the touch measurement signal shown in diagram 504 is aligned with the no-touch measurement signal to reduce the error value S3 to zero. The touch measurement signal can be adapted within milliseconds (ms) to arrive at a touch/no-touch decision, which is a sufficiently fast response time for detecting touches.

Although FIG. 5A shows example blocks of method 500A, in some implementations, method 500A may include additional blocks, fewer blocks, different blocks, or differently arranged blocks than those depicted in FIG. 5A. Additionally, or alternatively, two or more of the blocks of method 500A may be performed in parallel.

Figure 5B:
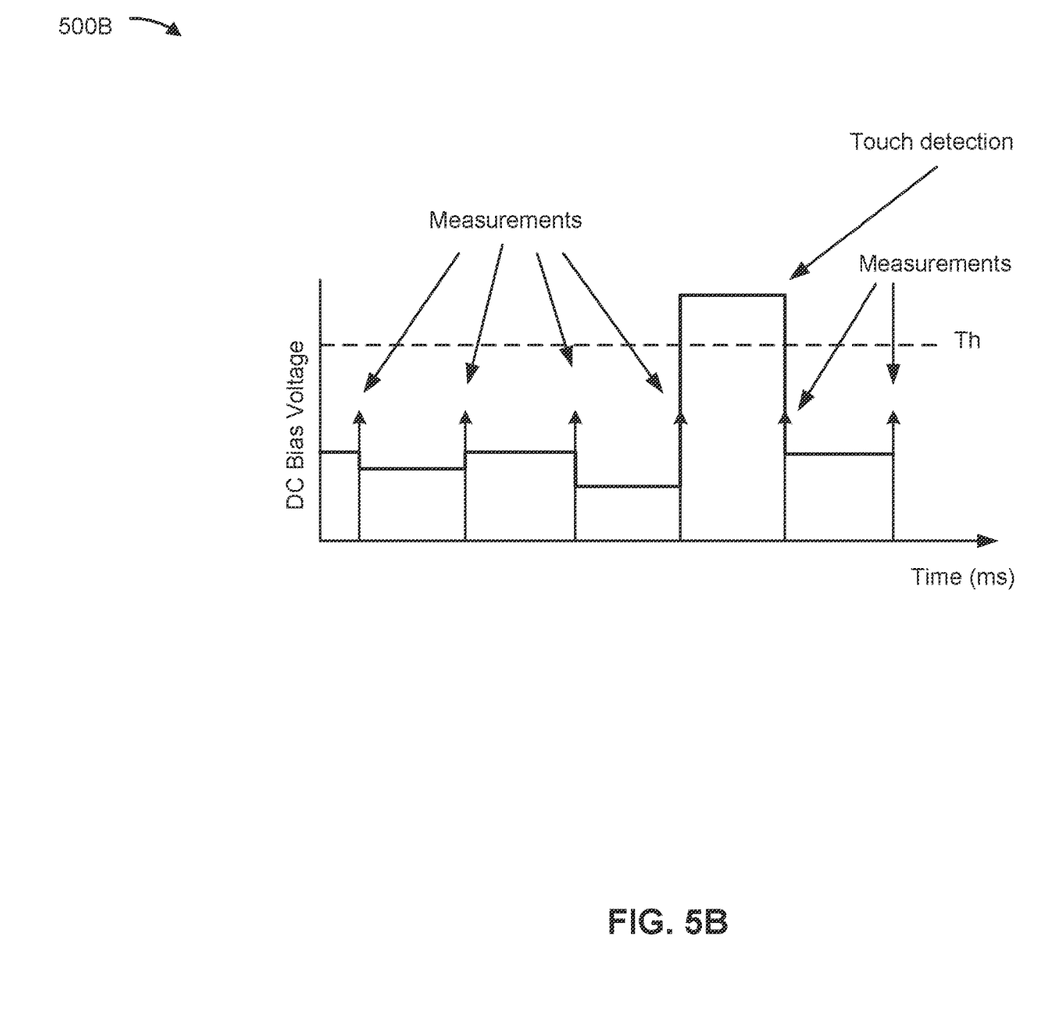
FIG. 5B illustrates a method of measuring a DC bias voltage according to one or more implementations.

FIG. 5B illustrates a method 500B of measuring a DC bias voltage according to one or more implementations. The DC bias voltage may be the TX DC bias voltage or the RX DC bias voltage. The controller 301 shown in FIG. 3 adjusts the DC bias voltage to reduce the error value S3 to zero. As a result, the DC bias voltage satisfies the threshold Th during a touch event. The measurement circuit 304 shown in FIG. 3 measures the DC bias voltage and detects the touch event when the DC bias voltage satisfies the threshold Th.

Although FIG. 5B shows an example of method 500B, in some implementations, measurements may be obtained in a different manner from a manner depicted in FIG. 5B. In some implementations, the measurements may be obtained in the analog domain, the digital domain, or in combination of the analog domain and the digital domain.

Figure 6:
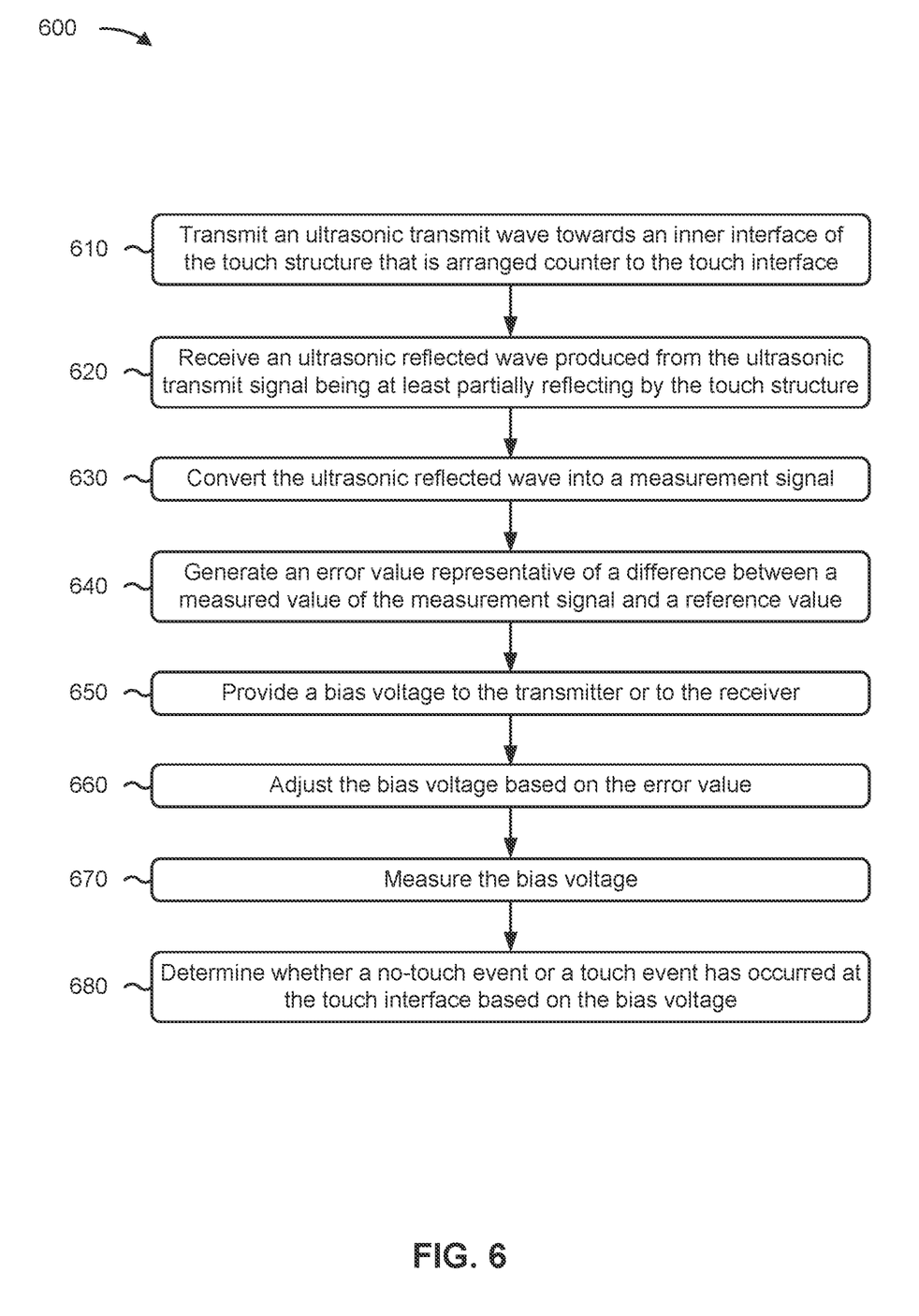
FIG. 6 illustrates a flowchart of an example process associated with an ultrasonic touch sensor with active feedback.

FIG. 6 illustrates a flowchart of an example process 600 associated with an ultrasonic touch sensor with active feedback. In some implementations, one or more process blocks of FIG. 6 may be performed by a touch sensor (e.g., an ultrasonic touch sensor 100). Additionally, or alternatively, one or more process blocks of FIG. 6 may be performed by one or more components of a touch sensor, such as a transmitter (e.g., transmitter 105), a receiver (e.g., receiver 106), a sensor circuit (e.g., sensor circuit 107), a controller (e.g., controller 301), a processing circuit (e.g., processing circuit 302), an error detector (e.g., error detector 303), a measurement circuit (e.g., measurement circuit 304), and/or the like.

As shown in FIG. 6, process 600 may include transmitting an ultrasonic transmit wave towards an inner interface of the touch structure that is arranged counter to the touch interface (block 610). For example, the transmitter 105 may transmit an ultrasonic transmit wave towards an inner interface of the touch structure that is arranged counter to the touch interface, as described above.

As further shown in FIG. 6, process 600 may include receiving an ultrasonic reflected wave produced from the ultrasonic transmit signal being at least partially reflecting by the touch structure (block 620). For example, the receiver 106 may receive an ultrasonic reflected wave produced from the ultrasonic transmit signal being at least partially reflecting by the touch structure, as described above.

As further shown in FIG. 6, process 600 may include converting the ultrasonic reflected wave into a measurement signal (block 630). For example, the receiver circuit may convert the ultrasonic reflected wave into a measurement signal, as described above.

As further shown in FIG. 6, process 600 may include generating an error value representative of a difference between a measured value of the measurement signal and a reference value (block 640). For example, the error detector 303 may generate an error value representative of a difference between a measured value of the measurement signal and a reference value, as described above.

As further shown in FIG. 6, process 600 may include providing a bias voltage (e.g., a DC bias voltage) to the transmitter or to the receiver (block 650). For example, the programmable voltage source 205 or the programmable voltage source 215 may provide a bias voltage to the transmitter 105 or to the receiver 106, respectively, as described above.

As further shown in FIG. 6, process 600 may include adjusting the bias voltage based on the error value (block 660). For example, the controller 301 may adjust the bias voltage based on the error value, as described above.

As further shown in FIG. 6, process 600 may include measuring the bias voltage (block 670). For example, the measurement circuit 304 may measure the bias voltage, as described above.

As further shown in FIG. 6, process 600 may include determining whether a no-touch event or a touch event has occurred at the touch interface based on the bias voltage (block 680). For example, the measurement circuit 304 may determine whether a no-touch event or a touch event has occurred at the touch interface based on the bias voltage, as described above.

Process 600 may include additional implementations, such as any single implementation or any combination of implementations described in connection with one or more other processes described elsewhere herein.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible implementations.

What is claimed is:

1. A touch sensor, comprising:
    a housing having an ultrasound chamber;
    a touch structure coupled to the housing and arranged over the ultrasound chamber such that the ultrasound chamber forms an enclosed interior volume, wherein the touch structure comprises a touch interface;
    a transmitter arranged inside the enclosed interior volume, wherein the transmitter is configured to transmit an ultrasonic transmit wave towards the touch structure;
    a receiver arranged inside the enclosed interior volume and coupled to the transmitter via a propagation path, wherein the receiver is configured to receive an ultrasonic reflected wave produced from the ultrasonic transmit wave and the propagation path;
    a programmable voltage source configured to provide a bias voltage to the transmitter or to the receiver;
    a receiver circuit configured to convert the ultrasonic reflected wave into a measurement signal and generate an error value representative of a difference between a measured value of the measurement signal and a reference value;
    a controller configured to adjust the bias voltage to a voltage level that reduces the error value; and
    a measurement circuit configured to measure the adjusted bias voltage and determine whether a no-touch event or a touch event has occurred at the touch interface based on a comparison of the measured adjusted bias voltage and a bias voltage threshold.

2. The touch sensor of claim 1, wherein the controller is configured to adjust the bias voltage to the voltage level to reduce the error value to a predetermined value.

3. The touch sensor of claim 1, wherein the controller is configured to adjust the bias voltage to the voltage level to maintain the measured value at the reference value.

4. The touch sensor of claim 1, wherein the controller is configured to adjust the bias voltage to the voltage level to cause the measurement signal to match an expected change of the measurement signal.

5. The touch sensor of claim 1, wherein the receiver circuit comprises a processing circuit configured to receive the measurement signal and determine a feature of the measurement signal to generate the measured value.

6. The touch sensor of claim 1, wherein the receiver circuit comprises an error detector configured to receive the measured value and the reference value, and generate the error value based on the difference between the measured value and the reference value.

7. The touch sensor of claim 1, wherein the receiver circuit comprises an error detector configured to receive the measured value as a measured process variable, receive the reference value as a setpoint, and generate the error value based on the difference between the measured value and the reference value.

8. The touch sensor of claim 1, wherein the receiver circuit includes an integrator that is configured to receive the measurement signal and generate the measured value as an integration result of the measurement signal over a predetermined time interval.

9. The touch sensor of claim 1, wherein the receiver circuit is configured to calculate a mean square error of the measurement signal as the measured value.

10. The touch sensor of claim 1, wherein the receiver circuit includes a peak detector that is configured to receive the measurement signal and detect signal peaks of the measurement signal, wherein the receiver circuit is configured to generate the measured value based on the signal peaks.

11. The touch sensor of claim 1, wherein the receiver circuit includes an analog processing circuit configured to process the measurement signal in an analog domain to generate the measured value as an analog measured value.

12. The touch sensor of claim 1, wherein the receiver circuit includes a first analog-to-digital converter (ADC) configured to generate a first plurality of digital samples from the measurement signal over a predetermined time interval and a processing circuit is configured to generate the measured value based on the first plurality of digital samples.

13. The touch sensor of claim 12, wherein the measurement circuit includes a second ADC configured to generate a second plurality of digital samples of the bias voltage and a comparator circuit configured to compare the second plurality of digital samples and a threshold to generate a plurality of comparison results, and wherein the measurement circuit is configured to detect the no-touch event or the touch event at the touch interface based on the plurality of comparison results.

14. The touch sensor of claim 13, wherein a first sampling rate of the first ADC at which the first plurality of digital samples are generated is higher than a second sampling rate of the second ADC at which the second plurality of digital samples are generated.

15. The touch sensor of claim 1, wherein:
the measurement circuit includes an analog-to-digital converter (ADC) configured to generate a plurality of digital samples of the bias voltage and a comparator circuit configured to compare the plurality of digital samples and a threshold to generate a plurality of comparison results, and
the measurement circuit is configured to detect the no-touch event or the touch event at the touch interface based on the plurality of comparison results.

16. The touch sensor of claim 15, wherein a sampling rate of the ADC at which the plurality of digital samples are generated is less than 1 MHz.

17. The touch sensor of claim 1, wherein:
the measurement circuit includes a comparator circuit configured to compare the bias voltage and a threshold during a measurement time interval to generate a comparison result, and
the measurement circuit is configured to detect the no-touch event or the touch event at the touch interface based on the comparison result.

18. The touch sensor of claim 1, wherein a property of the propagation path is configured to change in response to the touch event, which causes a property of the ultrasonic reflected wave to change.

19. The touch sensor of claim 1, wherein the measurement circuit is configured to compare the bias voltage and a threshold, detect the no-touch event when the bias voltage does not satisfy the threshold, and detect the touch event when the bias voltage satisfies the threshold.

20. A method, comprising:
transmitting an ultrasonic transmit wave towards an inner interface of a touch structure, wherein the inner interface is arranged opposite to a touch interface of the touch structure;
receiving an ultrasonic reflected wave produced from the ultrasonic transmit wave being at least partially reflected by the touch structure;
converting the ultrasonic reflected wave into a measurement signal;
generating an error value representative of a difference between a measured value of the measurement signal and a reference value;
providing a bias voltage to a transmitter or to a receiver;
adjusting the bias voltage to a voltage level that reduces the error value;
measuring the adjusted bias voltage; and
determining whether a no-touch event or a touch event has occurred at the touch interface based on a comparison of the measured adjusted bias voltage and a bias voltage threshold.

* * * * *